(12) United States Patent
Deng et al.

(10) Patent No.: US 11,035,562 B2
(45) Date of Patent: Jun. 15, 2021

(54) CUSTOM UNIVERSAL LIGHT SWITCH AND DIMMER

(71) Applicant: BrainofT Inc., Redwood City, CA (US)

(72) Inventors: Deng Deng, Mountain View, CA (US); Ashutosh Saxena, San Mateo, CA (US)

(73) Assignee: BrainofT Inc., Redwood City, CA (US)

( * ) Notice: Subject to any disclaimer, the term of this patent is extended or adjusted under 35 U.S.C. 154(b) by 44 days.

(21) Appl. No.: 16/416,656

(22) Filed: May 20, 2019

(65) Prior Publication Data

US 2019/0353337 A1 Nov. 21, 2019

Related U.S. Application Data

(60) Provisional application No. 62/674,446, filed on May 21, 2018.

(51) Int. Cl.
*F21V 23/04* (2006.01)
*H01H 23/12* (2006.01)
*H01H 19/14* (2006.01)
*H01H 13/14* (2006.01)

(52) U.S. Cl.
CPC ......... *F21V 23/0435* (2013.01); *H01H 13/14* (2013.01); *H01H 19/14* (2013.01); *H01H 23/12* (2013.01)

(58) Field of Classification Search
CPC .... F21V 23/0435; H01H 13/14; H01H 19/14; H01H 23/12

USPC .......................................... 200/5 A
See application file for complete search history.

(56) References Cited

U.S. PATENT DOCUMENTS

| | | | |
|---|---|---|---|
| 6,300,727 B1 | 10/2001 | Bryde et al. | |
| 2007/0007826 A1 | 1/2007 | Mosebrook et al. | |
| 2013/0063042 A1 | 3/2013 | Bora et al. | |
| 2015/0108901 A1* | 4/2015 | Greene et al. | H05B 37/02 315/149 |
| 2016/0255702 A1* | 9/2016 | Thompson | H05B 37/02 315/133 |

\* cited by examiner

*Primary Examiner* — Edwin A. Leon
*Assistant Examiner* — Iman Malakooti
(74) *Attorney, Agent, or Firm* — Shun Yao; Park, Vaughan, Fleming & Dowler LLP (57) ABSTRACT

One embodiment can provide a light switch module for controlling at least one light source coupled to the light switch module. The light switch module can include a manual control configured to receive a user manual operation; a control-signal-receiving module configured to receive, from a central controller, a control signal; and a switch-mode-configuration module coupled to the manual control and the control-signal-receiving module. The switch-mode-configuration module is configured to place the light switch in a first operation mode in response to receiving the control signal and place the light switch in a second operation mode in response to not receiving the control signal within a predetermined time interval.

20 Claims, 9 Drawing Sheets

CUSTOM UNIVERSAL LIGHT SWITCH AND DIMMER

RELATED APPLICATION

This application claims the benefit of U.S. Provisional Application No. 62/674,446, entitled "CUSTOM LIGHT SWITCH AND DIMMER," by inventors Deng Deng and Ashutosh Saxena, filed 21 May 2018, the disclosure of which is incorporated herein by reference in its entirety.

BACKGROUND

Field

This disclosure is generally related to home-automation devices. More specifically, this disclosure is related to custom light switches and dimmers that can be used to control smart light bulbs as well as conventional light bulbs.

Related Art

Home automation, or smart home, technologies have enhanced quality of life of their users. More specifically, a home-automation system enables centralized control of lighting, HVAC (heating, ventilation, and air conditioning), appliances, and other systems, thus providing improved convenience, comfort, energy efficiency, and security.

Among the various smart home technologies, smart lighting technologies have been the easiest to be adopted into homes. Smart lighting technologies can be implemented either through smart light switches or smart light bulbs. A smart light switch can control the room lighting by controlling the amount of current flows into a light bulb, whereas a smart light bulb can be controlled via a home-automation hub or a smartphone app. Smart light switches can provide automated switch-on and switch-off as well as dimming functions, and smart light bulbs can provide additional functions, such as color and ambience adjustments.

Due to cost concerns, many current homes may have a mixture of devices, including both smart and "dumb" devices. For example, some of the light bulbs installed within a home may be "smart," whereas other light bulbs can be conventional "dumb" light bulbs. Moreover, some of the light switches can be conventional "dumb" switches, which can include both dimmable and non-dimmable switches, whereas other light switches can be smart light switches. A user may wish to use the same type of light switches to control all lighting devices in a home, which can include smart, semi-smart, and dumb light bulbs. However, existing light switches often cannot work with such a wide range of light bulbs.

SUMMARY

One embodiment can provide a light switch module for controlling at least one light source coupled to the light switch module. The light switch module can include a manual control configured to receive a user manual operation; a control-signal-receiving module configured to receive, from a central controller, a control signal; and a switch-mode-configuration module coupled to the manual control and the control-signal-receiving module. The switch-mode-configuration module is configured to place the light switch in a first operation mode in response to receiving the control signal and place the light switch in a second operation mode in response to not receiving the control signal within a predetermined time interval.

In a variation on this embodiment, the manual control can include at least one mechanical switching mechanism. The at least one mechanical switching mechanism can include one or more of: a push button, a toggle switch, a rotary switch, and a slider switch. The user manual operation can include one or more operations on the mechanical switching mechanism.

In a variation on this embodiment, the light switch module can further include a switch-signal-transmitting module. When the light switch module is operating in the first operation mode, the switch-signal-transmitting module is configured to transmit a switch signal to the central controller in response to the manual control receiving the user manual operation, thereby allowing the central controller to control the light source based on the received user manual operation.

In a further variation, the switch signal can include at least a switch parameter corresponding to a desired light property of the light source.

In a variation on this embodiment, the light switch module can further include a power control module. When the light switch module is operating in the second operation mode, the power-control module is configured to adjust an amount of electrical power delivered to the light source in response to the manual control receiving the user manual operation.

In a further variation, while operating in the second operation mode, the light switch module can be configured as a light dimmer for a dimmable light source and as an on-off switch for a non-dimmable light source.

In a variation on this embodiment, the light switch module can further include a physical-state-tracking module for tracking a physical state of the light switch module and a logic-state-tracking module for tracking a logic state of the light switch module. The physical state indicates whether the light switch module provides power to the light source, and the logic state indicates a desired light property of the light source.

In a further variation, while operating in the first operation mode, a first user manual operation sets the logic state of the light switch module to an off state while leaving the physical state of the light switch module unchanged.

In a further variation, while operating in the first operation mode, a second subsequent user manual operation sets the physical state of the light switch to a reduced power state, thereby reducing an amount of power provided by the light switch module to the light source.

In a variation on this embodiment, the light switch module can further include one or more sensors, and the one or more sensors can include at least a motion sensor, a temperature sensor, a light sensor, and a presence sensor.

One embodiment provides a system for controlling a light source via a light switch. During operation, in response to receiving, by the light switch from a central controller, a control signal, the system places the light switch in a first operation mode; and in response to not receiving the control signal within a predetermined time interval, the system places the light switch in a second operation mode. The system receives a manual operation from a user and controls the light source based on the light switch's operation mode and the received manual operation.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the disclosed system is not limited to the embodiments shown, but is to be accorded the widest scope consistent with the principles and features disclosed herein.

Overview

Embodiments of the invention solve at least the technical problem of providing a light switch capable of controlling both conventional light bulbs, including both dimmable and non-dimmable ones, and smart light bulbs. More specifically, the light switch can operate in two modes, a dimmer mode for controlling conventional light bulbs and a switch mode for controlling smart light bulbs. When controlling a conventional light bulb, the light switch can operate in a way similar to a conventional light switch. The light switch can turn on and off a light bulb, and it can also brighten or dim a dimmable light bulb. On the other hand, when controlling a smart light bulb, the light switch can send a control signal via a wireless link to a home-automation controller, which interfaces with the smart light bulb to control the smart light bulb, including turning the light bulb on and off, brightening and dimming the light bulb, or changing the color of the light bulb. The light switch can conform to a standard form factor. In some embodiments, the light switch can have at least two push buttons to facilitate a user in executing various types of manual control.

In this disclosure, the term "light bulb" is used to referred to any light-emission device or light source, include but not limited to: incandescent light bulb or lamp, light-emitting diode (LED)-based light sources, and laser-based light sources.

Universal Light Switch

Figure 1:
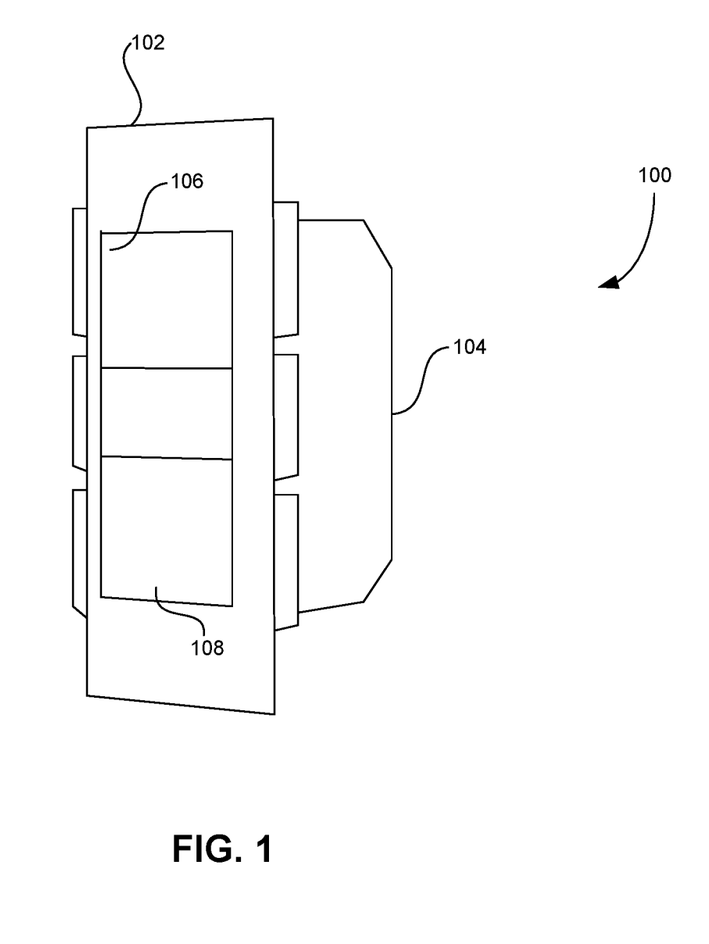
FIG. 1 presents a diagram illustrating an exemplary wall-mounted universal light switch, according to one embodiment.

FIG. 1 presents a diagram illustrating an exemplary wall-mounted universal light switch, according to one embodiment. Wall-mounted universal light switch 100 can include a front plate 102 and a housing 104. In some embodiments, front plate 102 can include a number (e.g., two) of push buttons, such as push buttons 106 and 108. These push buttons can be momentary switches. Note that, in addition to push buttons, other types of momentary switches, including but not limited to: toggle switches, slider switching, rotary switches, magnetic or reed switches, optical switches, etc., can also be used in universal light switch 100 to achieve desired switching functionalities. By clicking or pressing on these push buttons, a user can control (e.g., turning on and off or dimming) a light bulb coupled to universal light switch 100. For example, a user can click "on" button 106 to turn on the light bulb or click "off" button 108 to turn off the light bulb. Moreover, a user can press-and-hold "on" button 106 to increase the light intensity of the light bulb or press-and-hold "off" button 108 to decrease the light intensity of the light bulb. Other switching operations can also be accomplished via a combination of clicking and/or holding actions applied by the user.

Housing 104 is configured to house a number of control modules as well as electrical wires that facilitate the coupling between the light switch and the light bulb. In some embodiments, housing 104 can conform to a standard form factor. For example, the size of housing 104 can be substantially similar to that of a standard one-gang box (e.g., a one-gang box according to the standard in the United States or Japan). Wires within housing 104 can include various wire connections, including but not limited to: line, neutral, load, and traveler wires. Note that the traveler wire is an optional wire for a 3-way switch setup.

In some embodiments, universal light switch 100 can also include a front-facing motion sensor. Such a motion sensor can be placed behind front plate 102 and is not shown in FIG. 1. The motion sensor can act as an independent sensor and can detect human presence based on infrared signals. In some embodiments, the motion sensor can have a field of view of at least 120°. Universal light switch 100 can optionally have a visible light LED indicator to indicate the triggering of the motion sensor. To simply the design, in some embodiments, universal light switch 100 does not include the motion-indicating LED.

In some embodiments, the motion sensor can couple to the "on" and "off" buttons such that the motion-sensing outcome can trigger the on or off operation of the light bulb. For example, when the motion sensor detects human presence, the light switch can automatically turn on the light bulb. In some embodiments, the light bulb can be a smart light bulb and the motion-sensing outcome can be forwarded by universal light switch 100 to the home-automation controller, which then in turn controls the on and off of the smart light bulb. In addition to a motions sensor, universal light switch 100 can also include other types of sensor, including but not limited to: a temperature sensor, a light sensor, a presence sensor, etc.

As discussed previously, most light switches designed for smart light bulbs are not suitable for controlling conventional light bulbs; whereas conventional light switches, especially those for dimmable light bulbs, are not suitable for controlling smart light bulbs. In contrast, universal light switches described herein can be used to control both conventional and smart light bulbs. More specifically, the universal light switch can operate in two modes, a dimmer mode and a switch mode. When the universal light switch detects that it is coupled to a conventional (or "dumb") light bulb, it operates in the dimmer mode. On the other hand, when the universal light switch detects that it is coupled to a smart light bulb, it operates in the switch mode. A controller in the universal light switch can be responsible for ensuring that the light switch is operating in an appropriate operation mode.

Figure 2:
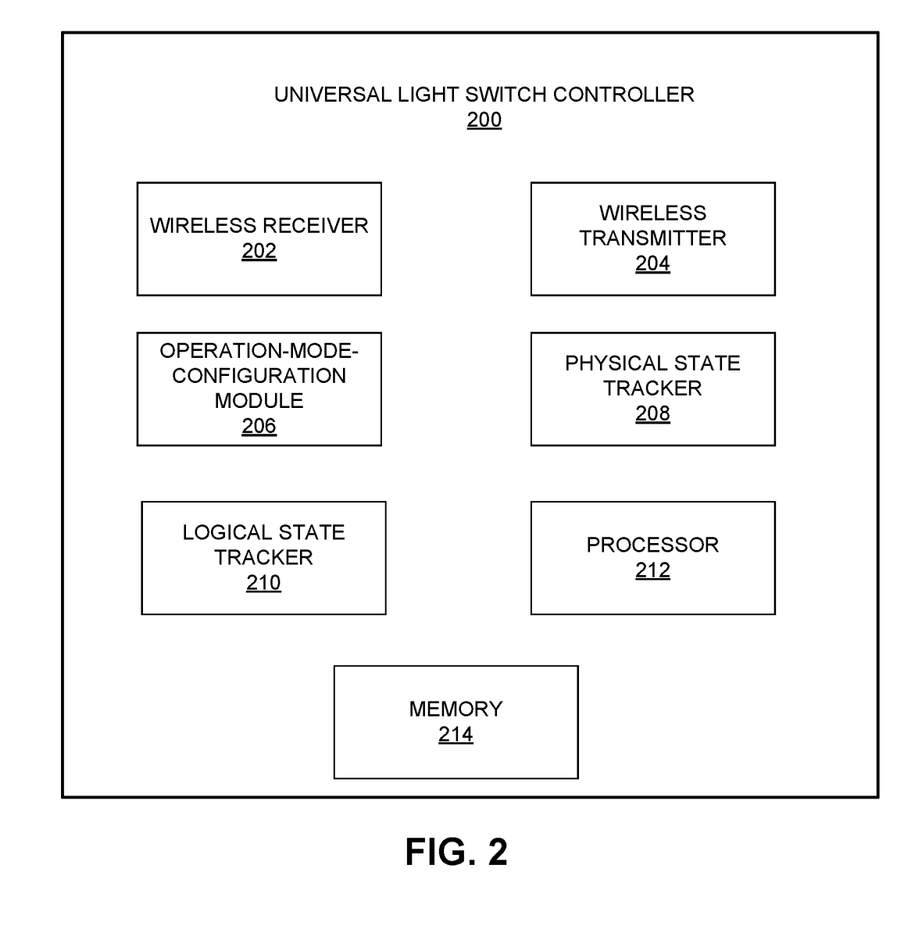
FIG. 2 presents a diagram illustrating a block diagram of an exemplary controller of the universal light switch, according to one embodiment.

FIG. 2 presents a diagram illustrating a block diagram of an exemplary controller of the universal light switch, according to one embodiment. Universal light switch controller 200 can include a wireless receiver 202, a wireless transmitter 204, an operation-mode-configuration module 206, a physical-state tracker 208, a logic-state tracker 210, a processor 212, and a memory 214.

Wireless receiver 202 can be responsible for receiving wireless signals from a home-automation device/controller, which is often located remotely (e.g., at a different room). For example, wireless receiver 202 can receive "pairing" signals used to pair a home-automation controller (e.g., a super sensor) with universal light switch 200. Detailed descriptions about the super sensor can be found in U.S. application Ser. No. 15/985,397, entitled "MULTI-MODAL INTERACTIVE HOME-AUTOMATION SYSTEM," by inventors Ashutosh Saxena, Lukas Kroc, Yu Zhou, and Deng Deng, file 21 May 2018, the disclosure of which is incorporated herein by reference in its entirety.

In some embodiments, wireless receiver 202 can be configured to receive "heartbeat" signals sent from the previously paired home-automation controller. Operation-mode-configuration module 206 can then determine the current mode of operation based on the presence or absence of the heartbeat signals. For example, if operation-mode-configuration module 206 determines that wireless receiver 202 have not receive the heartbeat signals for a predetermined duration, operation-mode-configuration module 206 can then determine that universal light switch is coupled to a conventional light bulb or that the home-automation controller is malfunctioning. In both scenarios, operation-mode-configuration module 206 places universal light switch 200 in the dimmer mode, thus allowing universal light switch 200 to directly control a conventional light bulb or a smart light bulb that has lost control. Such a direct control is often implemented through adjusting the current and/or voltage applied to a light socket, within which the light bulb is placed. On the other hand, if operation-mode-configuration module 206 determines that heartbeat signals have been received, it places universal light switch 200 in the switch mode to allow universal light switch 200 to control the smart light bulb by sending control signals to the home-automation controller. In some embodiments, the default operation mode of universal light switch 200 is the switch mode.

Wireless transmitter 204 can be responsible for transmitting wireless control signals to a home-automation controller. While operating in the switch mode, universal light switch 200 does not directly control current or voltage applied to the light socket. Instead, wireless transmitter 204 transmits a control signal, which can be generated based on the user's manual control, to the home-automation controller (e.g., the super sensor). For example, when a user presses or clicks a push button, wireless transmitter 204 can transmit a switch level report to the home-automation controller, which then control the smart light bulb based on the switch level report. For example, a higher switch level may result in a higher light intensity from the light bulb. In some embodiments, the communication between wireless receiver 202 or transmitter 204 and the home-automation controller can be carried over a wireless communication channel, such as a Wi-Fi™ and Bluetooth® channel, using a standard communication protocol, such as Z-Wave® and ZigBee®.

Physical-state tracker 208 and logic-state tracker 210 can be responsible for tracking the internal states of universal light switch 200. Different from conventional light switches that may only have physical states (e.g., switch on or off), universal light switch 200 can include a logic state in addition to the physical state. More specifically, the physical state of universal light switch 200 often reflects the electrical state of the light bulb. When the physical state of universal light switch 200 is "on," the light bulb receives electrical power from universal light switch 200. Note that receiving electrical power does not necessarily mean that the light bulb emits light. More particularly, a smart light bulb may receive electrical power such that its controller can receive commands from a control hub or mobile device (e.g., the home-automation controller). The control signals sent by the control hub or mobile device can be responsible for controlling light emission from the smart light bulb. On the other hand, when the physical state of universal light switch 200 is "off," the light bulb no longer receives electrical power. In such a scenario, a smart light bulb can no longer be controlled by any external control hub or mobile device, and a manual control via the light switch is needed to control the light bulb.

The logic state of light switch 200 can correspond to the light intensity of the light bulb. In some embodiments, the logic state of universal light switch 200 can be represented by a switch level ranging from 0 to 99, where 0 means zero light intensity and 99 means the maximum intensity. In other words, when the switch level of light switch 200 is zero, the light bulb is off, and when the switch level is 99, the light bulb is at its maximum intensity. For dimmable light bulb, the relationship between the switch level and the light intensity can be substantially linear. For non-dimmable light bulb, the relationship between the switch level and the light intensity can be a step function. The non-dimmable light bulb is turned on when the switch level is above a threshold and turned off when the switch level is below the threshold.

Physical-state tracker 208 tracks and determines the physical state of universal light switch 200. The current physical state of universal light switch 200 can be affected by a combination of previous physical and logic states and user actions. For example, if the previous physical state of the light switch is "off," a user can change the physical state to "on" by clicking the "on" button at least once. If the previous physical state of the light switch is "on," a user can change the physical state to "off" by clicking the "off" button at least twice. Depending on the operation mode of universal light switch 200, changing the physical state may require different user actions. When universal light switch 200 operates in the dimmer mode, the physical state of universal light switch 200 can follow the on-off status of the light bulb. On the other hand, when universal light switch 200 operates in the switch mode, the physical state of universal light switch 200 can be different from the on-off status of the light bulb.

Logic-state tracker 210 tracks the logic state of universal light switch 200. The logic state of universal light switch 200 can be determined based on its physical state, its previous logic state, and the user action (e.g., button clicking or holding). Note that same user actions may result in different changes in the logic state of universal light switch 200, depending on its physical state. For example, when the physical state of universal light switch 200 is "on," a user action of clicking the "on" button once can cause the logic state of universal light switch 200 to reach its maximum value, meaning that the light bulb is turned on to its full intensity; whereas clicking the "off" button once can cause the logic state of universal light switch 200 to reach its minimum value (e.g., 0). On the other hand, when the physical state of universal light switch 200 is originally in an "off" state, a user action of clicking the "on" button can cause the logic state of universal light switch 200 to return to a preset value. In some embodiments, such a preset value can be the value of the last logic state of light switch 200 before it is turned off.

Universal light switch 200 can also include a processor 212 for processing various commands received from a home-automation controller and a memory 214 for storing instructions that can be load to processor 212. Memory 214 can also be responsible for storing the last logic state of the light switch prior to the light switch being physically turned off (or having its physical state set to zero).

In addition to clicking the "on" or "off" button, a user may also hold the "on" or "off" button for a prolonged time. Holding the "on" button can typically result in the switch level being linearly increased until it reaches the maximum. Similarly, a user action of holding the "off" button can result in the switch level being linearly decreased until it reaches a predetermined minimum value (e.g., 1). Note that this minimum value is greater than 0, meaning that holding the "off" button only dims the light bulb to its minimum intensity and does not completely turn off the light bulb.

Figure 3A:
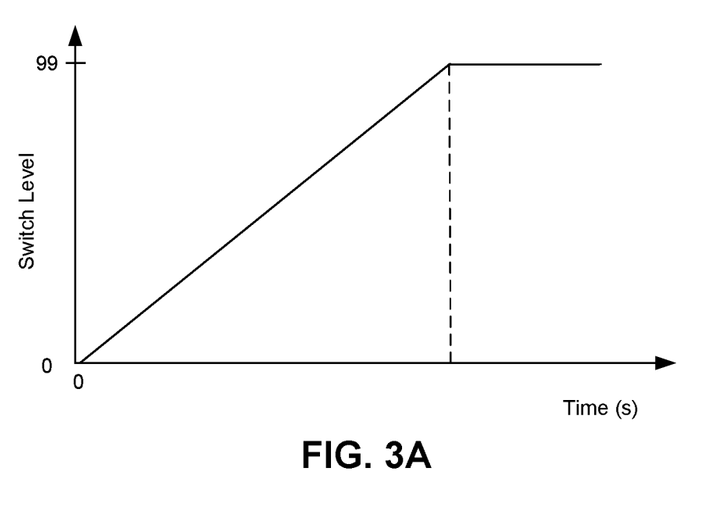
FIG. 3A shows the switch level as a function of the holding time of the "on" button, according to one embodiment.
Figure 3B:
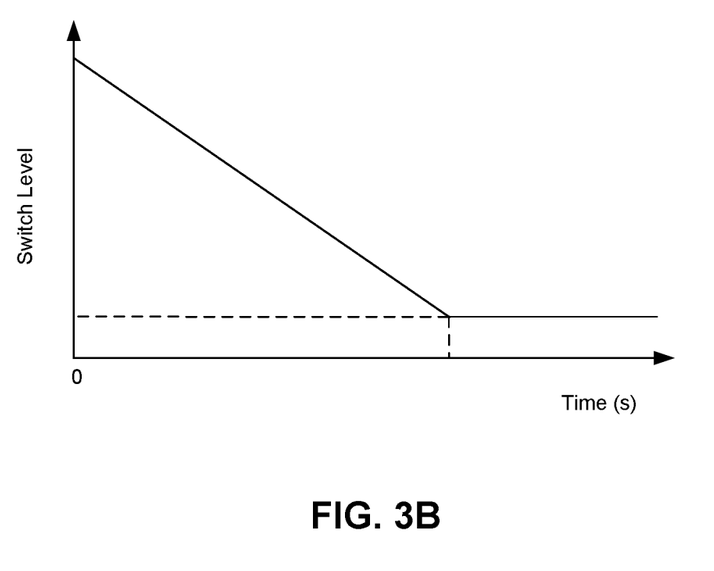
FIG. 3B shows the switch level as a function of the holding time of the "off" button, according to one embodiment.

FIG. 3A shows the switch level as a function of the holding time of the "on" button, according to one embodiment. As one can see, as the holding time increases, the switch level gradually increases to its maximum value and will not change further even if the user continues to hold the "on" button. FIG. 3B shows the switch level as a function of the holding time of the "off" button, according to one embodiment. As one can see, as the holding time increases, the switch level gradually decreases from its maximum value to a predetermined minimum value and will remain at the minimum value even if the user continues to hold the "off" button.

Note that for a non-dimmable light bulb, holding the "on" button does not introduce any change to the light intensity of the light bulb. If the non-dimmable light bulb was originally off, pressing-and-holding the "on" button gradually increases the switch level, and when the switch level is above a threshold, the non-dimmable light bulb is turned on. Similarly, if the non-dimmable light bulb was originally on, pressing-and-holding the "off" button decreases the switch level, and when the switch level is below a threshold, the non-dimmable light bulb is turned off.

In addition to a single click of the "on" or "off" button, in some embodiments, unique combinations of multiple user actions can also result in state changes of the universal light switch. For example, a user may double click the "on" or "off" button. A user action of double clicking the "on" button can result in the physical state being changed from "off" to "on," and the logic state being changed from 0 to a maximum value. On the other hand, a user action of double clicking the "off" button can result in the physical state of the light switch being changed from "on" to "off."

Figure 4A:
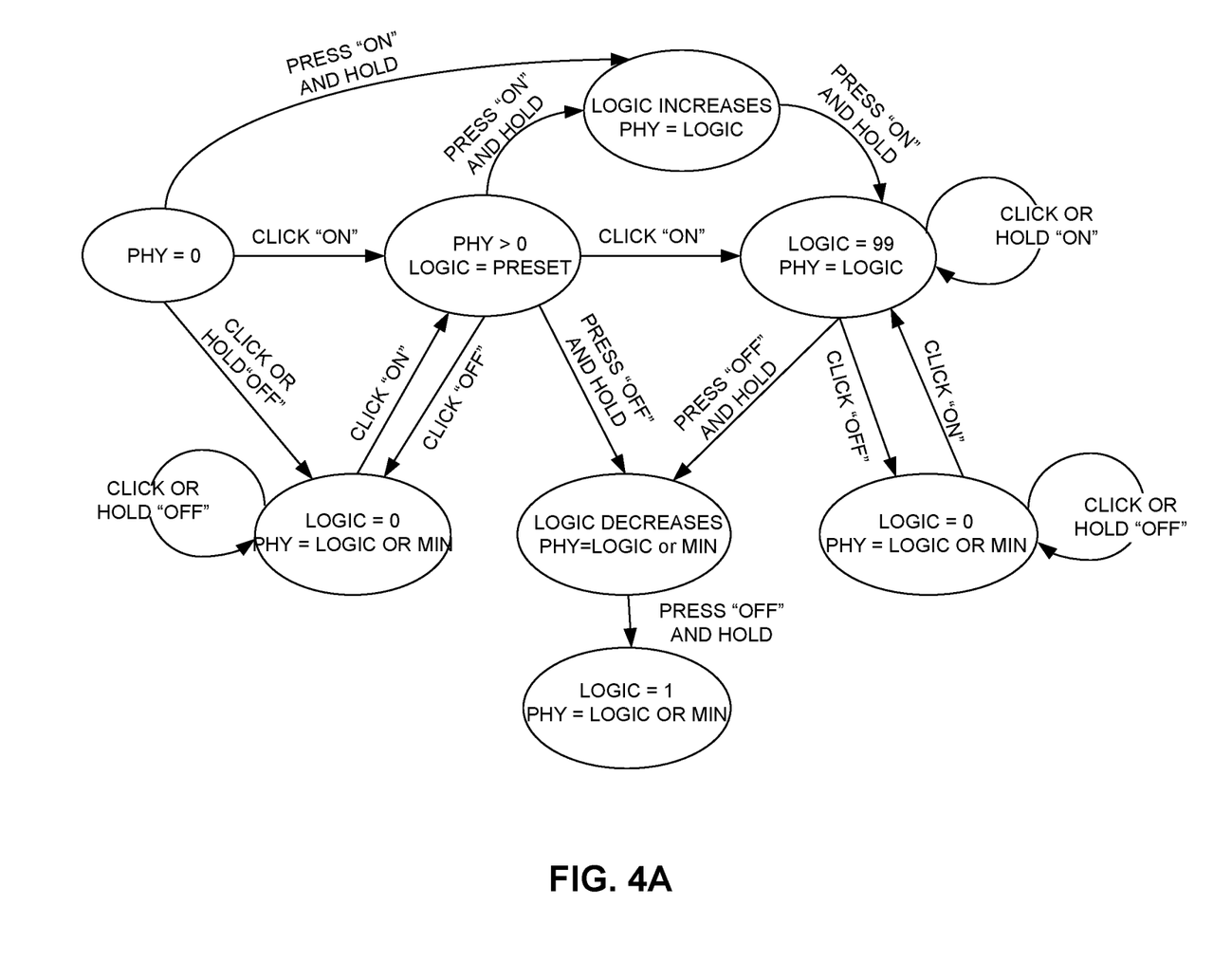
FIG. 4A shows an exemplary state diagram of a universal light switch operating in the dimmer mode, according to one embodiment.

FIG. 4A shows an exemplary state diagram of a universal light switch operating in the dimmer mode, according to one embodiment. In FIG. 4A, the initial physical state of a light switch is "off" (i.e., PHY=0). A user action of a single click of the "on" button can change the physical state of the light switch from "off" to "on" (i.e., PHY>0) and, at the same time, the logic state of the light switch can resume to a preset value. In some embodiments, the preset value can be the last switch level of the light switch or a switch level predetermined by the system. A single click of the "off" button sets the logic state of the light switch to zero. In the mean time, if the logic state of the light switch is greater than zero but below a predetermined minimum value, the physical state of the light switch is set as the minimum value. Otherwise, the physical state of the light switch is same as its logic state.

After the physical state becomes "on," a subsequent click of the "on" button can change the logic state of the light switch in such a way that the switch level reaches its maximum value (e.g., 99). In other words, a double click of the "on" button brings the light bulb to its maximum intensity. In addition to clicking actions, pressing-and-holding the "on" button can also change the logic state of the light switch in such a way that the switch level increases as the user continues to hold the "on" button, until the switch level reaches its maximum value or until the user releases the button. Once the logic state reaches its maximum value, subsequent clicking or holding of the "on" button no longer changes the logic and physical states of the switch. As one can see, while operating in the dimmer mode, the physical state of the switch substantially follows the logic state of the switch. In some embodiments, the physical state starts to follow the logic state once the logic state is above a predetermined minimum value. However, if the logic state is below such a minimum value, the physical state can either be 0, meaning the bulb is off, or be at the minimum value.

While the physical state of the light switch remains "on," a single click of the "off" button can set the logic state of the light switch to zero. Note that the logic state of the light switch right before it is turned off can be stored by the logic-state tracker such that a subsequent click of the "on" button may resume the logic state of the light switch to the stored value. Alternatively, the logic-state tracker can store a predetermined switch level (e.g., 99 or 50) and the subsequent single click of the "on" button can result in the logic state of the light switch being set to the predetermined switch level.

When the physical state of the light switch is "on," pressing-and-holding of the "off" button can decrease the logic state of the switch until it reaches a threshold (e.g., logic=1) or until the user releases the button.

Note that, when it is in the dimmer mode, the light switch operates in a same way similar to that of a conventional light switch. In other words, the light switch controls the amount of current sent to the light bulb through the switch. Various circuit designs can be used to facilitate the control of the current flow to ensure that it is responding to users' manual control actions on the switch buttons (e.g., click or press-and-hold). For example, the light switch can include a power-control module that is based on a triode-for-alternating-current (triac) device. The power control module can regulate the amount of electrical power provided to the light socket, within which the light bulb is placed.

Figure 4B:
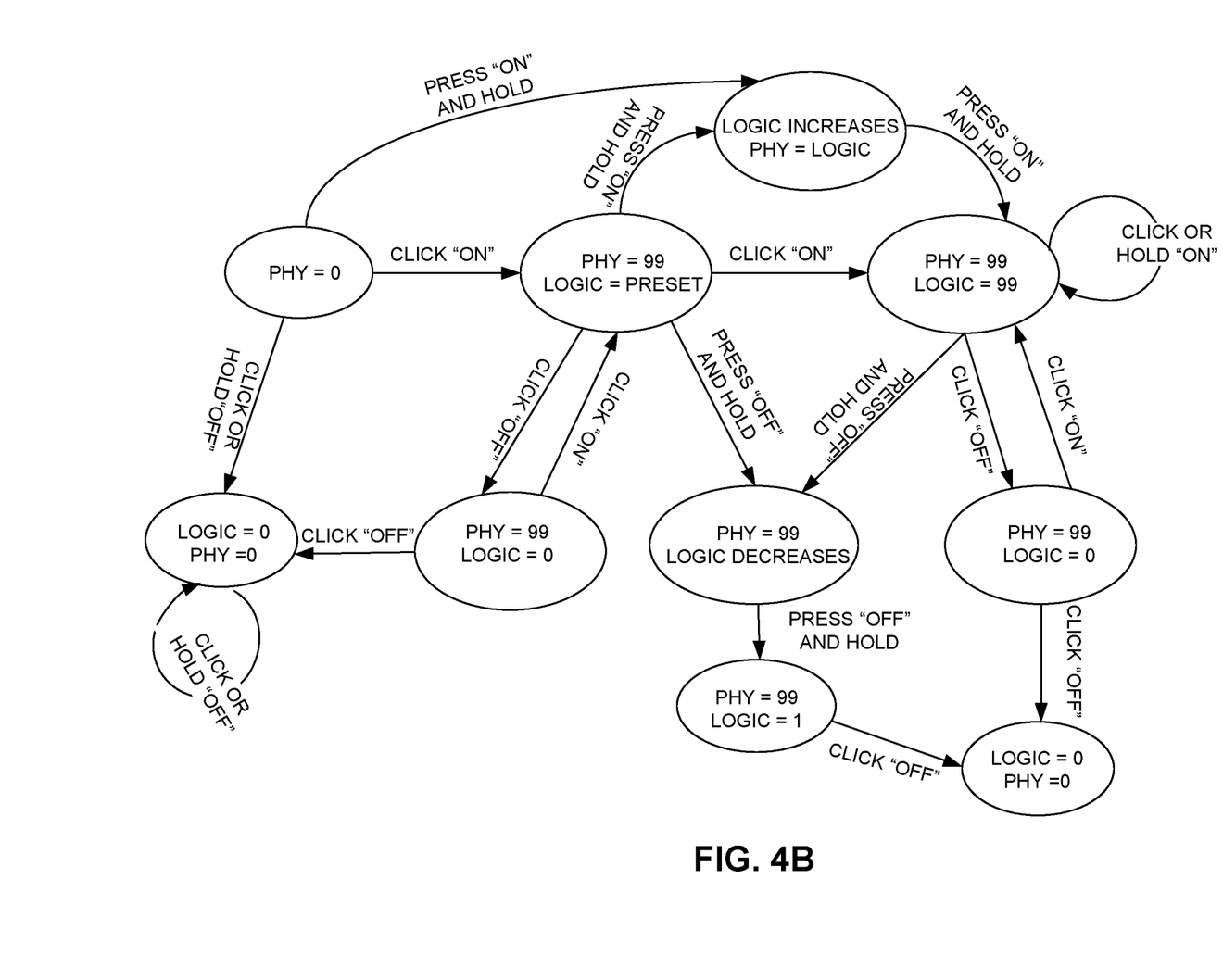
FIG. 4B shows an exemplary state diagram of a universal light switch operating in the switch mode, according to one embodiment.

FIG. 4B shows an exemplary state diagram of a universal light switch operating in the switch mode, according to one embodiment. In the switch mode, the physical state typically has only two values: zero and 99, where zero indicates an "off" state and 99 indicates an "on" state. In the switch mode, the physical state value no longer follows the logic state value. In the example shown in FIG. 4B, the initial physical state of a light switch is "off" (i.e., PHY=0). A single click of the "on" button can change the physical state of the light switch from "off" to "on" (i.e., PHY=99), and at the same time, the logic state of the light switch can resume to a preset value. The preset value can be the last switch level of the light switch or a switch level predetermined by the system. A single click of the "off" button sets the logic state of the light switch to zero while keeping its physical state unchanged.

After the physical state becomes "on," a subsequent click of the "on" button can change the logic state of the light switch in such a way that the switch level reaches a higher value (e.g., 50 or 99). In other words, double clicking the "on" button brings the light bulb to a greater light intensity. In some embodiments, double clicking the "on" button can set the switch level to its maximum value and the light bulb to its maximum intensity. In the switch mode, the press-and-hold operations can result in similar state transitions like those shown in FIG. 4A. However, in the switch mode, holding the "off" button typically does not change the physical state of the light switch.

When the physical state of the light switch is "on," a single click of the "off" button can change the logic state of the light switch to zero. However, the physical state of the light switch remains unchanged. A subsequent click of the "off" button is needed to bring the physical state of the light switch to "off" or zero. In other words, when the light bulb is on, a double click of the "off" button not only turns off the light bulb but also turns off the light switch (i.e., sets its physical state to "off"). Note that, when the physical state of the light switch is "off," the light bulb can no longer receive electrical power from the light switch. For a smart light bulb, this means that the smart light bulb can no longer receive commands from its external controller (e.g., the super sensor), and that the only way to control the smart light bulb right now is through manual operations on the light switch. On the other hand, if the physical state is "on," the smart light bulb can be turned on or off by its external controller. When the physical state of the light switch is "off," the state of the light bulb can be referred to as "hard off;" whereas, when the light bulb itself is off but the physical state of the light switch is "on," the state of the light bulb can be referred to as "soft off." When the light bulb is in the "hard off" state, manual controls using the light switch is needed to control the light bulb. On the other hand, the light bulb can be controlled remotely by a controller if it is in the "soft off" state. For conventional light bulbs, there is no difference between the "hard off" and "soft off" states, because a conventional light bulb, regardless of being dimmable or non-dimmable, can only be controlled via the light switch.

In some embodiments, instead of completely turning off the power provided by the light switch, a double click of the "off" button may set the physical state of the light switch to a reduced power state, thus reducing the amount of power that can be sent from the light switch to the light bulb. In some embodiments, at the reduced power state, the light bulb can function as an emergency light or a night light. Alternatively, the light bulb may emit light of a particular color or intensity.

When it is in the switch mode, the light switch can operate in a way similar to a control hub (e.g., the super sensor) of the smart light bulb. More specifically, instead of directly controlling the amount of current or voltage applied to the light socket, the light switch sends a control signal to the home-automation controller, which can in turn adjust the on-off status and/or light intensity of the light bulb according to a predetermined protocol. In some embodiments, the universal light switch can be configured to send control signals to the home-automation controller via various communication channels, including but not limited to: Wi-Fi, Bluetooth, Z-Wave, ZigBee, etc. In some embodiments, when operating in the switch mode, the light switch disables its power control module such that users' manual control no longer affects the amount of electrical power (e.g., voltage or current) transferred to the light socket from the light switch.

In addition to users' manual controls, the light switch may receive control signals from other home automation devices (e.g., the super sensor). Such control signals can also set the physical and logic states of the light switch, thus in turn setting the on-off status and/or light intensity of the light bulb coupled to the light switch. For example, a control signal can include an "on" or "off" command, which can be used to turn on or turn off the light bulb. Moreover, the "on" command can also include a positive command value that can be used to set the intensity of the light bulb. An "off" command can have a zero command value.

Figure 5:
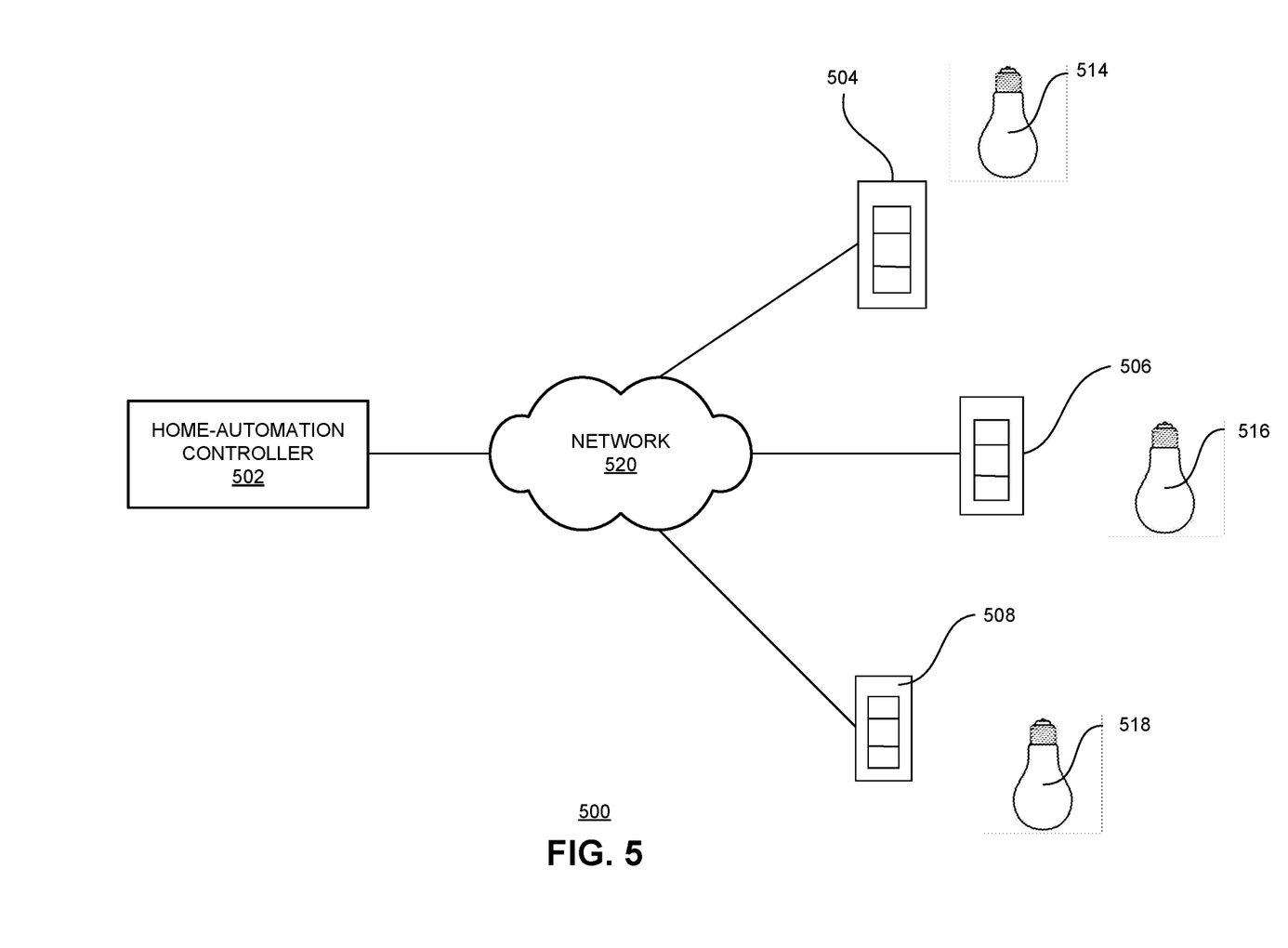
FIG. 5 shows an exemplary smart home environment, according to one embodiment.

FIG. 5 shows an exemplary smart home environment, according to one embodiment. In FIG. 5, a smart home 500 can include a home-automation controller 502, a number of universal light switches (e.g., light switches 504, 506, and 508), and a number of light bulbs coupled to the light switches (e.g., light bulbs 514, 516, and 518). In this example, light bulb 514 can be a conventional non-dimmable light bulb, light bulb 516 can be a conventional dimmable light bulb, and light bulb 518 can be a smart light bulb. Home-automation controller 502, light switches 504-508, and smart light bulb 518 can couple to a network 520.

During operation, light switches 504 and 506 fail to detect heartbeat signals from home-automation controller 502. Consequently, light switches 504 and 506 are configured to operate in the dimmer mode. On the other hand, light switch 508 receives periodic heartbeat signals from home-automation controller 502 and is configured to operate in the switch mode. Regardless of the mode of operation, light switches 504-508 may also receive control commands from home-automation controller 502. These control commands modify the physical and logic states of the light switches, thus consequently modifying the on-off status and/or the light intensity of light bulbs 514-518.

Home-automation controller 502 can be a wall-mounted device capable of providing automated controls to a number of devices via network 520. In addition to send commands to control the on-off status and/or the light intensity of the light bulbs, home-automation controller 502 can also configure the motion sensor on each light switch. For example, it can configure the sensitivity of the motion sensor. It may also configure the reset cycle (i.e., the time elapsed from presence "on" to "off" when no presence is detected) of the motion sensor. The default reset cycle can be 5 seconds. In some embodiments, home-automation controller 502 periodically polls the motion sensor status. Alternatively, the motion sensor can be configured in such a way that it only sends an update when its status changes (e.g., from presence "off" to "on" or from presence "on" to "off"). This way, motion sensor status reports do not flood the wireless in-home network.

In addition to light switches and light bulbs, home-automation controller 502 can also control other devices or appliances, including but not limited to: a smart door bell, a smart TV, an air conditioner, a refrigerator, etc. In some embodiments, home-automation controller 502 can be a super sensor.

Figure 6A:
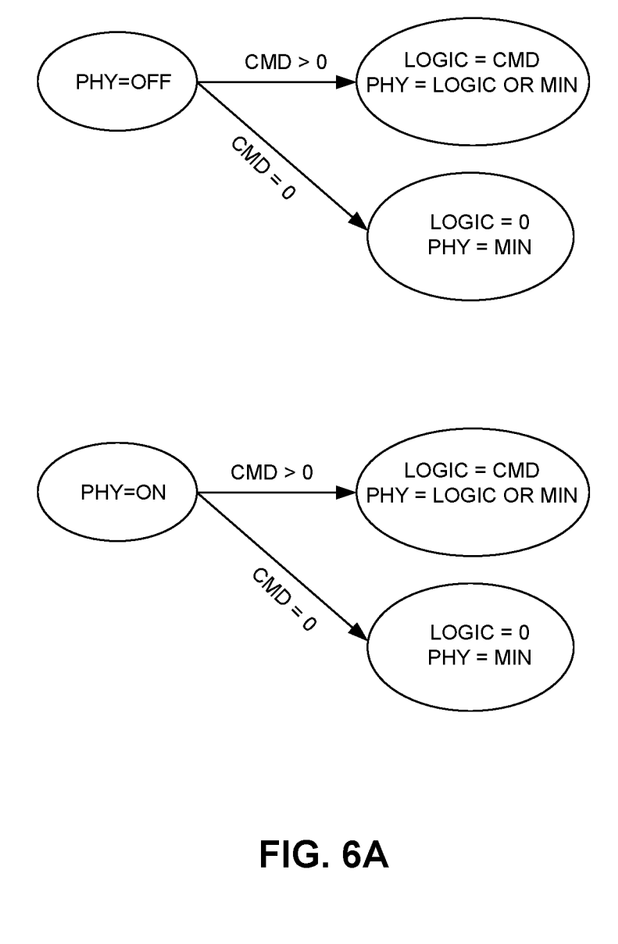
FIG. 6A shows an exemplary state diagram of a universal light switch operating in the dimmer mode, according to one embodiment.

FIG. 6A shows an exemplary state diagram of a universal light switch operating in the dimmer mode, according to one embodiment. When the initial physical state of a light switch is "off" (i.e., PHY=0), receiving an "on" command (CMD>0) from the external hub can set the logic state of the light switch to the command value. On the other hand, receiving an "off" command (CMD=0) can set the logic state of the light switch to zero, and set the physical state of the light switch to a predetermined minimum value. Similarly, when the initial physical state of the light switch is "on," receiving an "on" command from the home-automation controller can set the logic state of the light switch to the command value, whereas receiving an "off" command can set the logic state to zero and the physical state of the light switch to the predetermined minimum value. Similar to the scenarios shown in FIG. 4A, in the dimmer mode, the new physical state of the light switch follows the logic state, unless the logic state is below a minimum value. In such a case, the physical state of the light switch will be set at the minimum value.

Figure 6B:
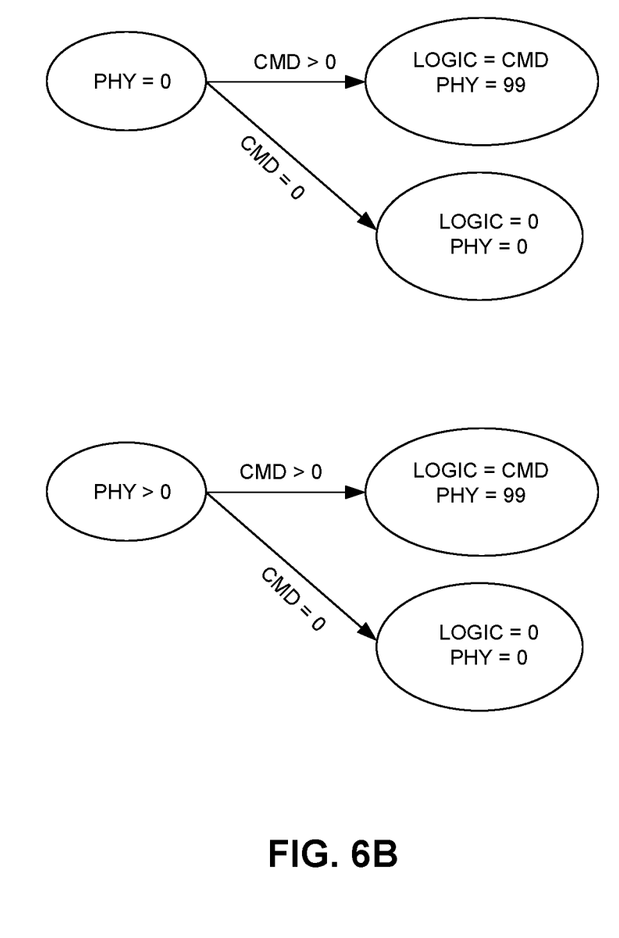
FIG. 6B shows an exemplary state diagram of a universal light switch operating in the switch mode, according to one embodiment.

FIG. 6B shows an exemplary state diagram of a universal light switch operating in the switch mode, according to one embodiment. In FIG. 6B, if the initial physical state of a light switch is "off" (i.e., PHY=0), an "on" command (CMD>0) from the home-automation controller can change the physical state from "off" to "on" (i.e., PHY=99) and set the logic state to the command value. On the other hand, an "off" command (CMD=0) can set the logic state to zero while leaving the physical state of the light switch unchanged.

When the initial physical state of the light switch is "on," receiving an "on" command from the home-automation controller can set the logic state to the command value and the physical state to "on" (i.e., PHY=99), whereas receiving an "off" command can set both the physical and logic states to zero. In other words, the "off" command from the home-automation controller can perform a similar function as that of a double click to turn off the light switch, such that the light switch no longer provides power to the light bulb.

Figure 7:
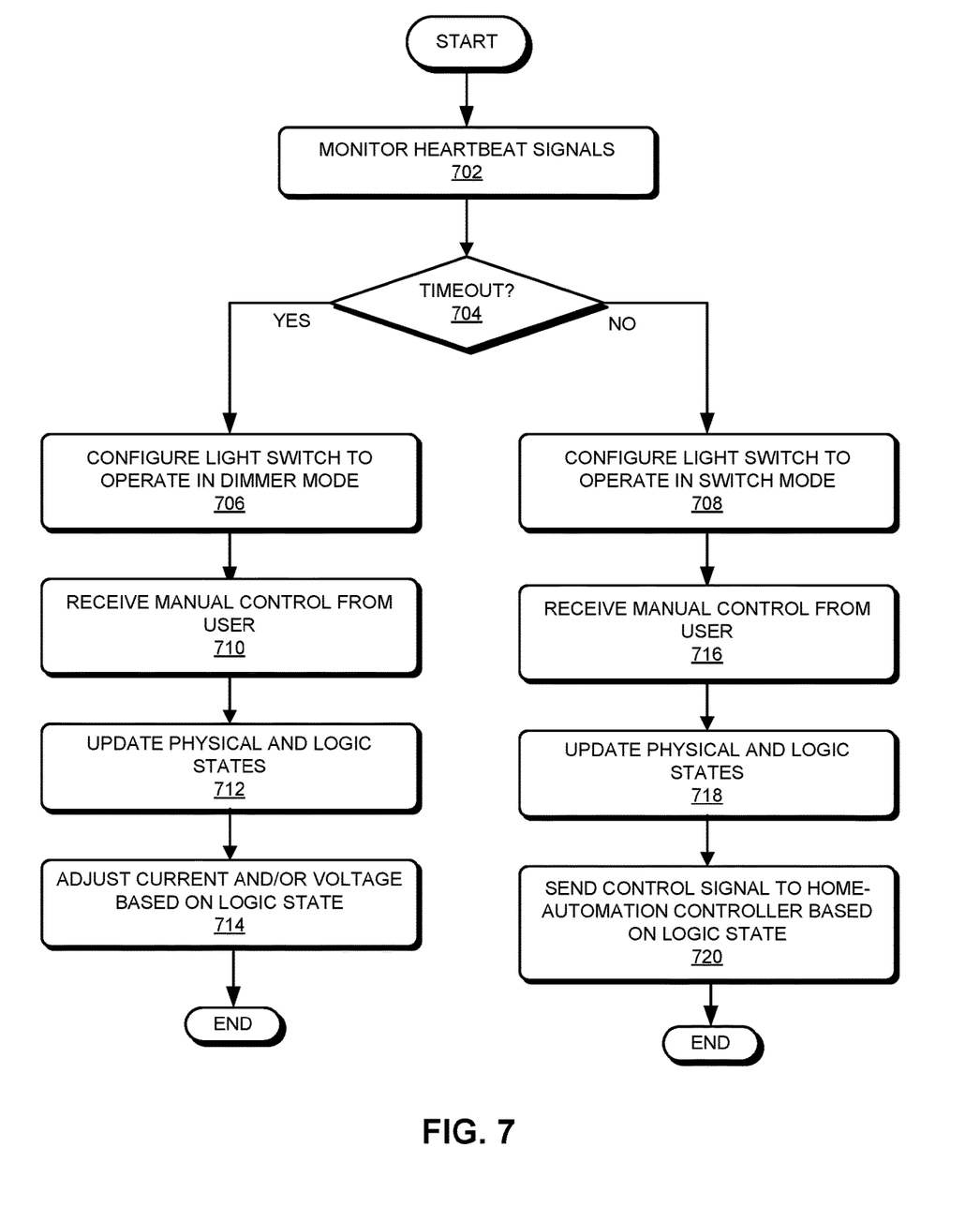
FIG. 7 presents a flowchart illustrating an exemplary operation process of a light switch, according to one embodiment.

FIG. 7 presents a flowchart illustrating an exemplary operation process of a light switch, according to one embodiment. During operation, the light switch monitors heartbeat signals sent by a home-automation controller (operation 702) to determine whether a timeout event occurs (operation 704). In some embodiments, a timeout event occurs when the light switch fails to receive a heartbeat signal for a predetermined duration (e.g., a few seconds or a few minutes). If the timeout event occurs, the light switch is configured to operate in the dimmer mode (operation 706). Otherwise, the light switch is configured to operate in the switch mode (operation 708). In some embodiments, configuring the light switch in the switch mode can involve disabling the power-control module in the light switch. Note that the timeout event may occur when a conventional or dumb light bulb is placed in the light socket coupled to the switch or when the home-automation controller is malfunctioning or losing communication with a smart light bulb placed in the light socket.

While in the dimmer mode, the light switch receives manual controls from a user (operation 710). For example, the user may manually operate the push buttons or other mechanical switching components (e.g., push buttons) on the light switch. In response to receiving a manual control, the light switch updates its internal physical and logic states (712). The light switch further adjusts the amount of current and/or voltage applied to the light socket based on the updated logic state (operation 714). The current or voltage change can cause a light bulb, regardless of whether it is a conventional or smart light bulb, in the socket to change its lighting status, such as being tuned on or off, or being brightened or dimmed.

On the other hand, when operating in the switch mode, the light switch receives a manual control from a user (operation 716) and updates its internal physical and logic states (operation 718). The light switch further sends a control signal to a home-automation controller based on its updated logic state (operation 720). For example, the control signal may include a switch-level value, which is determined based on the logic state of the light switch. Such a switch-level can then be used by the home-automation controller to control the smart light bulb. For example, the switch-level value can be used to control the light intensity of the smart light bulb. In addition to the switch level, the control signal may include other parameters that can be used to control the emission property of the smart light bulb. The emission property of the smart light bulb can include but are not limited to: light intensity, color, directionality, etc.

In general, embodiments of the present invention can provide a light switch that can operate with both smart and conventional light bulbs. More specifically, the light switch can be configured to operate in two modes, one for controlling conventional light bulbs and one for controlling smart light bulbs. When controlling a conventional light bulb, the light switch can function in a way similar to that of a conventional dimmer, and a user can manually operate the light switch to turn on and off or brightening and dimming the light bulb. More specifically, the user's manual operation can directly affect the amount of current and/or voltage applied to the light socket, thus changing the lighting status (e.g., on, off, or light intensity) of the light bulb. On the other hand, when controlling a smart light bulb, the user's manual operations on the light switch can be translated into control commands to be sent to a home-automation controller, which in turn controls the lighting status of the smart light bulb. Moreover, even after the user's manual operation turns off the smart light bulb (i.e., clicking the "off" button on the light switch once), a remote controller can still be able to control the smart light bulb. A user can manually override the remote controller by double clicking the "off" button on the light switch. The light switch itself can also be controlled by a home-automation controller (e.g., a super sensor). More specifically, the light switch is equipped with a wireless receiver for receiving control commands from the home-automation controller.

In the example shown in FIG. 1, the light switch includes two push buttons, which are momentary switches. In practice, the manual controls on the light switch can have different forms, and a different number of manual controls can be included in the light switch. For example, there can be fewer or more push buttons. Alternatively, in addition to push buttons, the momentary switches can have different forms, such as switches that can be pushed sideways (e.g., joy sticks, toggle switches, or slider switches). Additional examples of momentary switches can also include rotary switches, magnetic or reed switches, optical switches, etc. Moreover, in addition to momentary switches, other types of switches (e.g., maintained switches) can also be implemented in the light switch. The actual physical implementations of the light switch do not limit the scope of this disclosure. Similarly, the physical dimension of the light switch can also vary. In addition to the one-gang box shown in FIG. 1, the light switch can have different form factors.

The state diagrams shown in FIGS. 4A-4B demonstrate various manual manipulations performed by the user, such as clicking (single or double) and press-and-hold. In practice, other types of manual maneuver, such as a combination of clicks of different buttons or a combination of clicks and holds, may also result in different switching operations. In some embodiments, the activation of the various switch operations can be determined based on the duration and/or frequency of the user manual operations. For example, a long push or a short push may result in a different state change. A double or triple press within a predetermined duration may result in a different state change. For toggle switches, the toggle duration, direction, and/or frequency can affect the state changes. By separately maintaining logic and physical states of the light switch, embodiments of the present invention allow the on-off status of the light bulb to be different from the on-off status of the light switch. When the logic state is "off" and the physical state is "on," the light switch is in a "soft off" state, where the light bulb can still be controlled by a remote hub or controller. On the other hand, when both the logic and physical states are "off," the light switch is in a "hard off" state, where the light bulb can no longer be controlled directly by a remote hub or controller.

The foregoing descriptions of various embodiments have been presented only for purposes of illustration and description. They are not intended to be exhaustive or to limit the present system to the forms disclosed. Accordingly, many modifications and variations will be apparent to practitioners skilled in the art. Additionally, the above disclosure is not intended to limit the present system.

What is claimed is:

1. A light switch module for controlling at least one light source coupled to the light switch module, comprising:
   a manual control configured to receive a user manual operation;
   a control-signal-receiving module configured to receive, from a central controller, a wireless control signal; and
   a switch-mode-configuration module coupled to the manual control and the control-signal-receiving module and configured to:
      in response to receiving the wireless control signal, place the light switch in a remote-control operation mode to enable the light switch to control the light source by transmitting a switch signal to the central controller; and
      in response to not receiving the wireless control signal within a predetermined time interval, place the light switch in a manual operation mode to enable the light switch to control the light source by directly adjusting an amount of electrical power supplied to the light source.

2. The light switch module of claim 1, wherein the manual control comprises at least one mechanical switching mechanism,
   wherein the at least one mechanical switching mechanism comprises one or more of: a push button, a toggle switch, a rotary switch, and a slider switch, and
   wherein the user manual operation includes one or more operations on the mechanical switching mechanism.

3. The light switch module of claim 1, further comprising a switch-signal-transmitting module;
   wherein the switch signal is transmitted by the switch-signal-transmitting module to the central controller, in response to the manual control receiving the user manual operation, thereby allowing the central controller to control the light source based on the received user manual operation.

4. The light switch module of claim 3, wherein the switch signal comprises at least a switch parameter corresponding to a desired light property of the light source.

5. The light switch module of claim 1, further comprising a power control module;
   wherein the power-control module is configured to adjust the amount of electrical power supplied to the light source in response to the manual control receiving the user manual operation.

6. The light switch module of claim 1:
   wherein, while operating in the manual operation mode, the light switch module is configured as a light dimmer for a dimmable light source and configured as an on-off switch for a non-dimmable light source.

7. The light switch module of claim 1, further comprising a physical-state-tracking module for tracking a physical state of the light switch module and a logic-state-tracking module for tracking a logic state of the light switch module, wherein the physical state indicates whether the light switch module provides power to the light source, and wherein the logic state indicates a desired light property of the light source.

8. The light switch module of claim 7:
   wherein, while operating in the remote-control operation mode, a first user manual operation sets the logic state of the light switch module to an off state while leaving the physical state of the light switch module unchanged.

9. The light switch module of claim 8:
   wherein, while operating in the remote-control operation mode, a second subsequent user manual operation sets the physical state of the light switch module to a reduced power state, thereby reducing an amount of power provided by the light switch module to the light source.

10. The light switch module of claim 1, further comprising one or more sensors, wherein the one or more sensors comprise at least a motion sensor, a temperature sensor, a light sensor, and a presence sensor.

11. A method for controlling a light source via a light switch, the method comprising:
    in response to receiving, by the light switch from a central controller, a wireless control signal, placing the light switch in a remote-control operation mode to enable the light switch to control the light source by transmitting a switch signal to the central controller;
    in response to not receiving the wireless control signal within a predetermined time interval, placing the light switch in a manual operation mode to enable the light switch to control the light source by directly adjusting an amount of electrical power supplied to the light source;
    receiving a user manual operation on the light switch; and
    controlling the light source based on the light switch's operation mode and the received user manual operation.

12. The method of claim 11, wherein light switch includes at least one mechanical switching mechanism,
    wherein the at least one mechanical switching mechanism comprises one or more of: a push button, a toggle switch, a rotary switch, and a slider switch, and
    wherein the user manual operation includes one or more operations on the mechanical switching mechanism.

13. The method of claim 11,
    wherein, while operating in the remote-control operation mode, the light switch is configured to transmit the switch signal to the central controller in response to receiving the user manual operation.

14. The method of claim 11, wherein the switch signal comprises at least a switch parameter corresponding to a desired light property of the light source.

15. The method of claim 11,
wherein, while operating in the manual operation mode, the light switch is configured to adjust the amount of electrical power supplied to the light source in response to the received user manual operation.

16. The method of claim 11, wherein, while operating in the manual operation mode, the light switch is configured to:
brighten or dim-a dimmable light source; and
turn on or off a non-dimmable light source.

17. The method of claim 11, further comprising:
tracking a physical state of the light switch module, wherein the physical state indicates whether the light switch module provides power to the light source; and
tracking a logic state of the light switch module, wherein the logic state indicates a desired light property of the light source.

18. The method of claim 17, wherein placing the light switch in the remote-control operation mode further comprises:

in response to receiving first user operation, setting the logic state of the light switch to an off state while leaving the physical state of the light switch unchanged.

19. The method of claim 18, wherein placing the light switch in the remote-control operation mode further comprises:

in response to receiving a second subsequent operation, setting the physical state of the light switch module to a reduced power state, thereby reducing an amount of power provided by the light switch to the light source.

20. The method of claim 11, further comprising receiving from at least one sensor on the light switch sensor-status reports, wherein the at least one sensor comprises at least a motion sensor, a temperature sensor, a light sensor, and a presence sensor.

* * * * *